M. MARTINDALE.
ADJUSTABLE BEARING.
APPLICATION FILED AUG. 18, 1919.

1,319,885.

Patented Oct. 28, 1919.
2 SHEETS—SHEET 1.

Witness

Inventor
M. Martindale
By C. A. Snow & Co.
Attorneys.

M. MARTINDALE.
ADJUSTABLE BEARING.
APPLICATION FILED AUG. 18, 1919.

1,319,885.

Patented Oct. 28, 1919.
2 SHEETS—SHEET 2.

Inventor,
M. Martindale
By C. A. Snow & Co.
Attorneys.

UNITED STATES PATENT OFFICE.

MOSES MARTINDALE, OF VINCENNES, INDIANA.

ADJUSTABLE BEARING.

1,319,885.  Specification of Letters Patent.  Patented Oct. 28, 1919.

Application filed August 18, 1919. Serial No. 318,344.

*To all whom it may concern:*

Be it known that I, MOSES MARTINDALE, a citizen of the United States, residing at Vincennes, in the county of Knox and State of Indiana, have invented a new and useful Adjustable Bearing, of which the following is a specification.

This invention relates to improvements in agricultural machinery, and more particularly to shock absorbing bearings, or bearings adapted to compensate to the jar directed to the frame of the machine, and the machinery thereof, due to the machine passing over rough or irregular ground surface.

The primary object of the invention is to provide a bearing of this character to be used in connection with the main supporting shaft, or the shaft which supports the bull wheel of the machine, to permit said shaft to move freely, with relation to the frame in which the same is supported, thereby relieving the machinery, and frame thereof, of all undue strain.

A further object of the invention is to provide a compensating bearing of this character which will cushion the movements of the shaft with relation to the frame of the machine.

A still further object of the invention is to provide an outer stationary casing, and an inner movable member, the outer casing having a removable wall to permit the inner movable member to be readily removed.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawings:—

Figure 1:
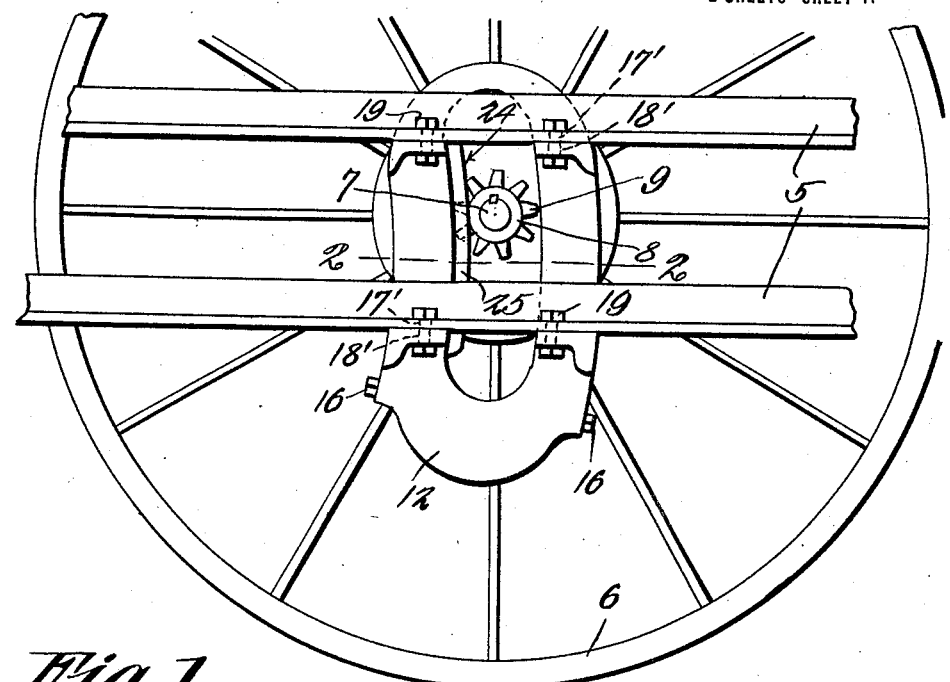
Figure 1 illustrates a side elevational view of a wheel, and a portion of a frame, with my invention secured thereto.
Figure 2:
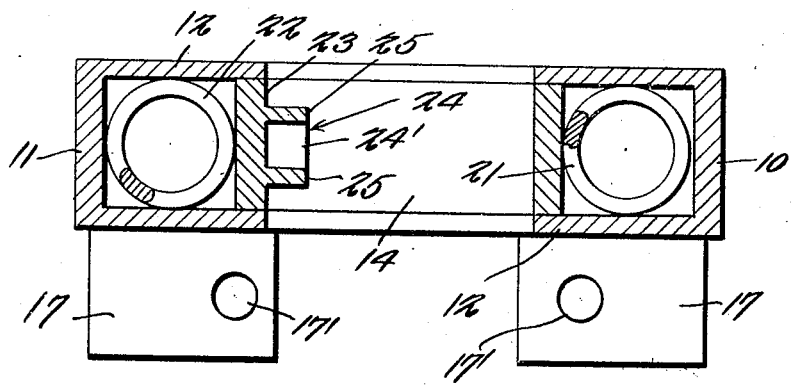
Fig. 2 is a transverse sectional view taken on line 2—2 of Fig. 1.

Referring to the drawings in detail, the reference character 5 designates the side bar of one side of the frame of a machine, said side bars 5, as shown being spaced apart, to receive the compensating bearing, forming the subject matter of the present invention.

The usual bull wheel 6, operates on the supporting axle 7, which is connected to the side bars of the frame, and as shown supports the cog wheel 8, having teeth 9, meshing with the teeth of the inner movable section of the compensating bearing, said cog wheel 8, as shown, being keyed to said axle 7, to move therewith.

The compensating bearing, includes the relatively long casing, formed of cast iron or other suitable material, and includes the integral curved front and rear walls 10 and 11, the side walls 12, the upper integral wall 13, and the removable lower wall 14, which is provided with threaded openings 15, to receive the threaded shanks of the securing bolts 16.

Integral shoulders 17 are formed on the side wall 12, on one side of the casing, said shoulders 17 being provided with openings 17', which register with openings 18' formed in the side bars of the frame, through which registering openings extend the securing bolts 19, whereby the compensating bearing is secured to the frame of the machine.

Projecting from the inner front and rear walls 10 and 11, of the casing, are the opposed lugs 20, formed integral with the inner surfaces of the walls 10 and 11, each of which lugs being provided with a relatively flat lower surface, forming an abutment for the upper ends of the coiled spring members 21 and 22, forming a part of the invention.

The inner or movable section of the compensating bearing, includes the relatively long bearing member 23, positioned within the casing, the sides of this bearing member 23 being of a width to be substantially housed by the side walls 12 of the casing.

As shown, the bearing member 23 is provided with a rack bar 24 formed throughout the length of the inner surface of one of the side walls thereof, and formed substantially intermediate the width of said wall, and having the lateral reinforcing plates 25, formed on opposite sides of the teeth thereof, to guard the teeth and to prevent the gear wheel 8, supported on axle 7 from being moved out of engagement with the teeth 24' of said rack bar.

This movable bearing member 23, is provided with laterally extending lugs 26, which lugs form seats for the coiled spring members 21 and 22, and as shown these spring members 21 and 22 are disposed between the lugs 26, for normally holding the lugs in spaced relation with each other.

From the foregoing, it is obvious, that the coiled spring members 21 and 22 are held against displacement by the coöperating walls of the bearing members, and that movement of the cog wheel 8, produces a relative movement of the inner, or movable bearing section, with relation to the casing, against the tension of the coiled spring members 21 and 22, with the result that the machine supported on a shaft, having connection with a bearing of this kind is relieved of the jar caused by the machine passing over rough or irregular ground surfaces.

Figure 7:
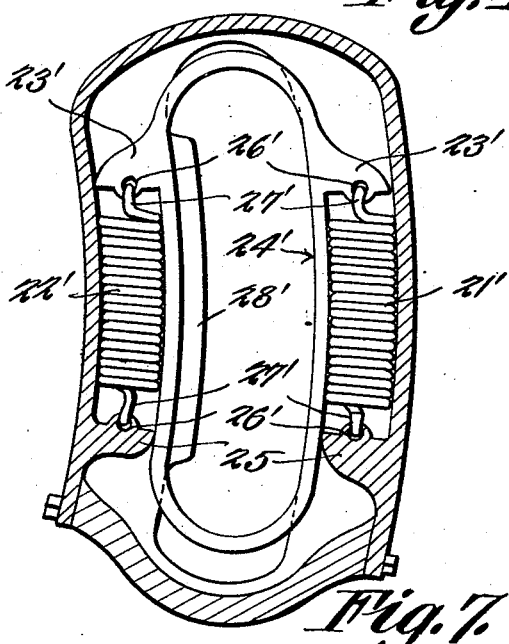
Fig. 7 is a side elevational view of a modified form of the bearing, with one of the side walls thereof removed.

In the modified form of the invention, shown more particularly by Fig. 7 of the drawings, the movable bearing member operates against the compression of coiled spring members 21' and 22', since the lugs 23', or upper lugs, are formed integral with the movable bearing member 24', the lower lugs 25', being formed integral with the outer member or casing.

Figure 3:
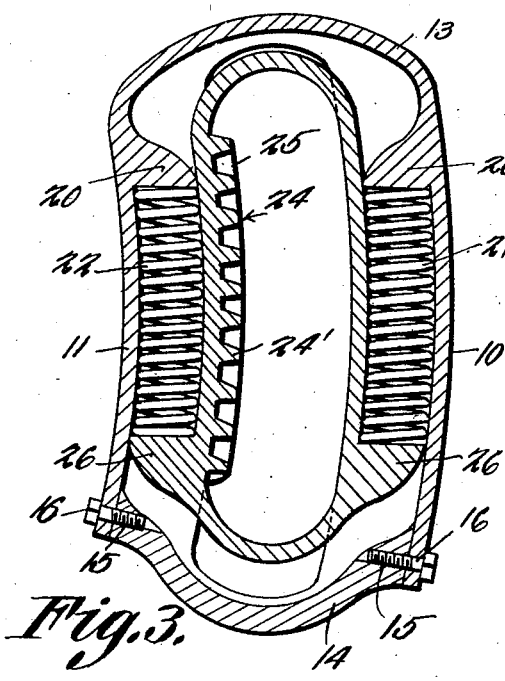
Fig. 3 is a longitudinal sectional view of the compensating bearing.
Figure 4:
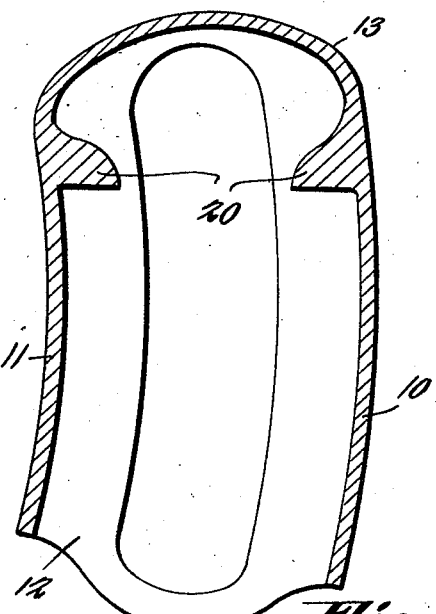
Fig. 4 is a side elevational view of the casing, with one of the side walls thereof removed.
Figure 5:
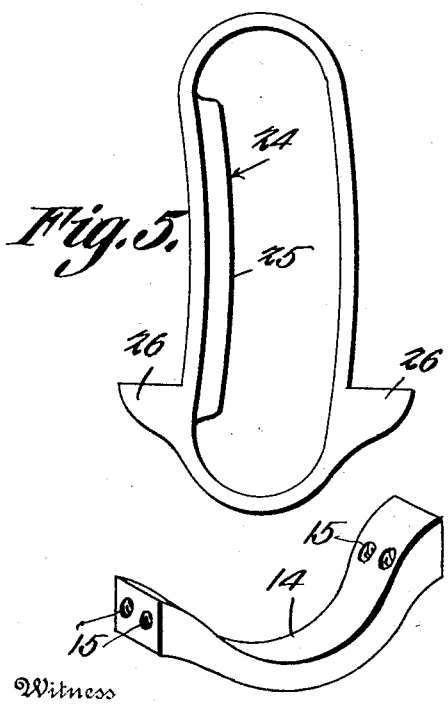
Fig. 5 is a side elevational view of the inner movable member.
Figure 6:
Fig. 6 is a respective view of the removable end wall.

In this form of the invention, the lugs are provided with eyes 26', through which extend the hooked ends 27', of the spring members 21' and 22' whereby the spring members have connection with the element of the compensating bearing. It will also be seen that in this form, the inner or movable bearing member, is provided with the rack 28', formed integral therewith, which rack is adapted to coöperate with a gear or cog wheel, as shown at 8, when the modified form of bearing is employed in place of the structure disclosed by Fig. 3 of the drawing.

Having thus described the invention, what is claimed is:—

1. In combination with an axle having a cog wheel supported on one end thereof, a compensating bearing including a stationary casing having integral lugs, a movable member positioned within the stationary member, said movable member having lugs, coiled spring members positioned between the lugs, for normally holding the lugs in spaced relation with each other, and means for providing connection between the cog wheel and movable member.

2. In combination with an axle having a cog wheel, secured thereto, a compensating bearing including a stationary casing having lugs extending from the inner walls thereof, an inner movable member having a rack formed integral with one of the walls thereof, lugs formed on the inner movable member, resilient means positioned between the lugs, for holding the lugs of the casing and movable member normally in spaced relation with each other, and means for securing the stationary casing to the frame of a machine.

3. In combination with an axle having a cog wheel secured thereto, a compensating bearing including a stationary member, and an inner movable member, means on the inner movable member for providing connection between the cog wheel and the movable member, means for restricting movement of the movable member with relation to the stationary member, and means for securing the casing to the frame of a machine.

4. In combination with an axle having a cog wheel secured thereto, a compensating bearing including a stationary casing, a movable member operating within the casing, means for providing connection between the cog wheel and movable member, means for restricting movement of the movable member with relation to the casing, a removable end wall forming a part of the casing, to permit the movable member to be removed therefrom, and means for securing the casing to the frame of a machine.

In testimony that I claim the foregoing as my own, I have hereto affixed my signature in the presence of two witnesses.

MOSES MARTINDALE.

Witnesses:
 HARRY D. SIMPSON,
 HENRY M. SIMPSON.